United States Patent
Harbin et al.

(10) Patent No.: US 7,195,438 B2
(45) Date of Patent: Mar. 27, 2007

(54) SWAGE TYPE FASTENER

(75) Inventors: Thomas E. Harbin, Westminster, CA (US); Hai-Tao Wang, Fountain Valley, CA (US); Michael U. March, Torrance, CA (US)

(73) Assignee: Huck International, Inc., Tucson, AZ (US)

( * ) Notice: Subject to any disclaimer, the term of this patent is extended or adjusted under 35 U.S.C. 154(b) by 99 days.

(21) Appl. No.: 10/753,000

(22) Filed: Jan. 5, 2004

(65) Prior Publication Data
US 2005/0079030 A1 Apr. 14, 2005

Related U.S. Application Data

(60) Division of application No. 10/186,940, filed on Jun. 28, 2002, now Pat. No. 6,702,684, which is a continuation-in-part of application No. 10/117,741, filed on Apr. 5, 2002, now abandoned.

(51) Int. Cl.
*F16B 19/00* (2006.01)
(52) U.S. Cl. ............... 411/361; 470/10; 470/361; 29/525.03
(58) Field of Classification Search ............ 411/361; 470/2, 5, 6, 10; 29/515, 520, 715, 525.11, 29/525.01, 525.02, 502.03
See application file for complete search history.

(56) References Cited

U.S. PATENT DOCUMENTS

| | | | | | |
|---|---|---|---|---|---|
| 2,531,048 | A | * | 11/1950 | Huck | 411/361 |
| 3,204,331 | A | * | 9/1965 | Looker | 29/446 |
| 3,460,429 | A | * | 8/1969 | Torre | 411/28 |
| 3,483,788 | A | * | 12/1969 | Keeler | 411/361 |
| 3,915,053 | A | * | 10/1975 | Ruhl | 411/361 |
| 4,221,152 | A | * | 9/1980 | Jason | 411/360 |
| 4,472,096 | A | * | 9/1984 | Ruhl et al. | 411/361 |
| 4,519,736 | A | * | 5/1985 | Sigmund | 411/361 |
| 4,813,834 | A | * | 3/1989 | Smith | 411/337 |
| 4,867,625 | A | * | 9/1989 | Dixon | 411/361 |
| 4,943,196 | A | * | 7/1990 | Dahl | 411/361 |
| 5,548,889 | A | * | 8/1996 | Smith et al. | 29/715 |
| 5,604,968 | A | * | 2/1997 | Fulbright et al. | 29/407.05 |
| 5,685,663 | A | * | 11/1997 | Sadri | 403/284 |

(Continued)

OTHER PUBLICATIONS

ALCOA Product Catalogue—Spin-Lok™ and Huck-Fit® products, downloaded from www.azlcoa.com/global/en/products; undated, 4 pages total.*

*Primary Examiner*—Katherine Mitchell
(74) *Attorney, Agent, or Firm*—Greenberg Traurig LLP

(57) ABSTRACT

A fastening system is provided that includes a fastener having a pin member with a lock groove and crest geometry that is optimized to receive swaged material from collars of materials of different strengths for securing workpieces for different load applications. The lock grooves have the longest width required for collars of lower strength for one application or greater strength for a second application and the crests have the longest width required for collars of greater strength for the second application whereby satisfactory clamp and tensile loads and resistance to failure will result when the lock grooves are filled with collar materials of different strengths. Certain collars of different materials have similar outside diameters for installation by a tool having a swage anvil with a uniform swage cavity that swages the collars into the lock grooves for securing workpieces in shear, shear/tension, shear composite and shear/tension composite applications.

21 Claims, 4 Drawing Sheets

U.S. PATENT DOCUMENTS

| | | | |
|---|---|---|---|
| 6,233,802 B1 * | 5/2001 | Fulbright | 29/243.519 |
| 6,325,582 B1 * | 12/2001 | Sadri et al. | 411/361 |
| 6,497,024 B2 * | 12/2002 | Fulbright | 29/243.522 |
| 6,702,684 B2 * | 3/2004 | Harbin et al. | 470/2 |
| 2001/0029651 A1 * | 10/2001 | Fulbright | 29/243.522 |
| 2004/0028500 A1 * | 2/2004 | Monserratt et al. | 411/361 |

* cited by examiner

SWAGE TYPE FASTENER

CROSS REFERENCE TO RELATED APPLICATIONS

This application is a divisional application of U.S. Ser. No. 10/186,940 now U.S. Pat. No. 6,702,684, filed Jun. 28, 2002, which is a continuation-in-part application of U.S. Ser. No. 10/117,741, filed Apr. 5, 2002, now abandoned.

FIELD OF THE INVENTION

The present invention relates to a two piece, swage type fastener including a pin and a collar with the collar adapted to be swaged into lock grooves on the pin and more particularly to swage type fasteners that have an optimized lock groove and crest design for use in a plurality of applications with a plurality of collars of different materials and strength. The optimized lock groove and crest design can be used in a plurality of applications due to the lock grooves and crests being able to receive swaged materials from collars made of different materials and strength during swage. A method of designing a fastener is also provided that has a lock groove and crest geometry that is optimized and is provided as a uniform construction for use in the plurality of applications with collars of different materials and strength.

BACKGROUND OF THE INVENTION

Swage fasteners can be of a pull type or stump type. A typical swage type fastener includes a pin and a collar with the pull type fastener having a pin shank having a locking portion with lock grooves and a pull portion with pull grooves. The pull grooves are adapted to be gripped by matching teeth in chuck jaws of an installation tool having a swage anvil adapted to engage the collar whereby a relative axial force can be applied between the pin and collar to move the anvil over the collar to swage it into the lock grooves.

With respect to swage fasteners of the pull type, the pull portion is connected to the lock groove portion via a breakneck groove of reduced strength which is adapted to fracture at a preselected magnitude of axial tensile force greater than required to swage the collar whereby the pull portion, or pintail, will be severed and removed from the pin shank after completion of swaging. The breakneck groove is of sufficient strength to withstand the high tensile load for swaging and the pull grooves must be similarly of sufficient strength to accept the relative axial pull load applied by the engaged teeth of chuck jaws of the installation tool. This routinely requires that the pull portion be of a relatively large diameter so as to have sufficient material to provide the necessary size and strength for the breakneck groove and also to inhibit fracturing of the pull grooves instead of the breakneck groove.

A typical stump type fastener includes a pin and a collar that has a pin shank having a locking portion with lock grooves. The difference between a swage fastener of the pull type and the stump type is that the stump type does not have a pull portion with pull grooves. Also, in the stump type fastener system, an installation tool is used that has a swage anvil adapted to engage the collar to apply a relative axial force between the pin and collar to move the anvil over the collar to swage it into the lock grooves and a bucking member that is used to engage the pin head.

U.S. Pat. Nos. 6,325,582, 6,233,802, 5,125,778, 5,090, 852, 5,049,016, 4,867,625, 4,813,834, 4,472,096, 4,221,152 and 4,208,943 were issued to the assignee of the present invention or a predecessor in interest. These patents all relate to various swage fastener designs and are representative of the art. In the prior art, a fastener was typically optimized for a particular collar for a particular application. Also, in the prior art, fasteners typically had a single grip range. A single grip range means that a fastener could fasten workpieces that have variations in thickness of 1/16 of an inch.

The optimization technique employed by the present invention departs from the prior art practice of optimizing a fastener for a particular collar for a particular application. In the present invention, the lock groove and crest geometry is optimized for use in a plurality of applications wherein the lock grooves and crests are each provided with the longest width required for a specific application to provide the fastening system with satisfactory clamp and tensile loads and resistance to failure in the plurality of applications when the lock grooves are filled with various materials from different collars of various strengths. Also, the lock groove and crest geometry is of a uniform construction that is used in the plurality of applications that enables the lock grooves and crests for each pin diameter to be manufactured with tooling that uses a common lock groove and crest geometry. Such an approach reduces costs associated with the tooling.

Additionally, for each pin size, certain collars of different materials have about the same outside diameter so an installation tool with a uniform swage anvil geometry can be used to swage those collars of different materials into the lock grooves to install the swage type fastener in workpieces for shear, shear/tension, shear composite and shear/tension composite application. Such an approach reduces the costs associated with labor in exchanging a swage anvil in the tool that is used in such applications.

Furthermore, the fastener of the present invention has a double grip range. Double grip means that a fastener can fasten workpieces that vary in thickness up to 1/8 of an inch. Such an approach increases the versatility of the fastener.

SUMMARY OF THE INVENTION

It is an object of the present invention to provide a swage type fastener having a pin member with a lock groove and crest geometry that is optimized that is capable of having collars of various materials and strength swaged into the lock grooves with the lock grooves and crests being of a uniform construction for each pin diameter for use in connection with collars of different materials and strength.

It is another object of the invention to provide a swage type fastener having a pin member with a lock groove and crest geometry that is optimized that is capable of having collars of various materials and strength swaged into the lock grooves wherein the various materials provide the fastener with different clamp and tensile loads for use in a plurality of applications.

It is yet another object of the invention to provide a swage type fastener having a pin member with a lock groove and crest geometry that is optimized that is capable of having collars of various materials and strength swaged into the lock grooves wherein certain collars have about the same outside diameter that enables a common installation tool having a swage anvil with a uniform swage cavity to be used to swage these collars of different materials into the lock grooves to install the swage type fastener in workpieces for shear, shear/tension, shear composite and shear/tension composite applications.

It is yet another object of the present invention to provide a swage type fastener that has a double grip range.

It is yet another object of the invention to provide a method of designing a swage type fastener with a lock groove and crest geometry that is optimized that is capable of having collars of various materials and strength swaged into the lock grooves wherein the various materials provide the fastener with different clamp and tensile loads for use in a plurality of applications.

Certain objects of the invention are achieved by a fastening system that includes a fastener, for securing a plurality of workpieces together, the fastening system having a pin member having a lock groove and crest geometry that is optimized. The optimized lock groove and crest geometry is adapted to receive swaged material from a plurality of collars of different materials and strengths for securing workpieces in different applications having different load requirements, wherein the lock grooves are provided with the longest width required for collars of lower strength for one application or greater strength for a second application and the crests are provided with the longest width required for collars of greater strength for the second application whereby the fastening system will provide satisfactory clamp and tensile loads and resistance to failure in the plurality of applications when the lock grooves are filled with collar materials of different strengths. Such an optimization results in an overall minimization of size and weight of the fasteners with lock grooves and crests of a uniform construction for use with collars of different materials and strength. The lock groove and crest geometry for the pin member is of a uniform construction that is used in the plurality of applications with one or more pin members of a common diameter. Certain collars of different strengths are provided with about the same outside diameter. Such a construction permits use of a common installation tool having a swage anvil with a uniform swage cavity that swages such collars of different strengths into the lock grooves of the pin member for installing the swage type fastener in workpieces for shear, shear/tension, shear composite and shear/tension composite applications.

Other objects of the invention are achieved by a method of designing a fastener to be used in a fastening system. The method includes obtaining the clamp and tensile load requirements for a plurality of applications, optimizing the lock groove geometry by providing the lock grooves with the longest width required for collars of lower strength for one application or greater strength for a second application and optimizing the crest geometry by providing the crests with the longest width required for collars of greater strength for the second application. This method permits standardizing the optimized lock groove and crest geometry for the pin member for use of the swage type fastener in a plurality of applications with one or more pin members of a common diameter. Also, certain collars of different strength materials are provided with about the same outside diameter that are adapted to be swaged into the lock grooves to provide the fastening system with satisfactory clamp and tensile loads and resistance to failure in shear, shear/tension, shear composite and shear/tension composite applications.

Swage type fasteners are used for a variety of different applications including the joining of workpieces of various types of materials with a predetermined clamp and tensile load. For example, in aircraft applications, the workpieces can be of a lightweight metal such as aluminum or can be made of composite materials. The swage type fastener of the present invention is particularly useful because it may be used in connection with fastening metallic workpieces, composite workpieces or combinations thereof. As such, the swage type fastener of this invention is particularly advantageous in that it can be used in a variety of applications due to the ability of the optimized lock grooves of the pin member to be filled with various materials of different collars.

DETAILED DESCRIPTION OF PREFERRED EMBODIMENTS

Figure 1:
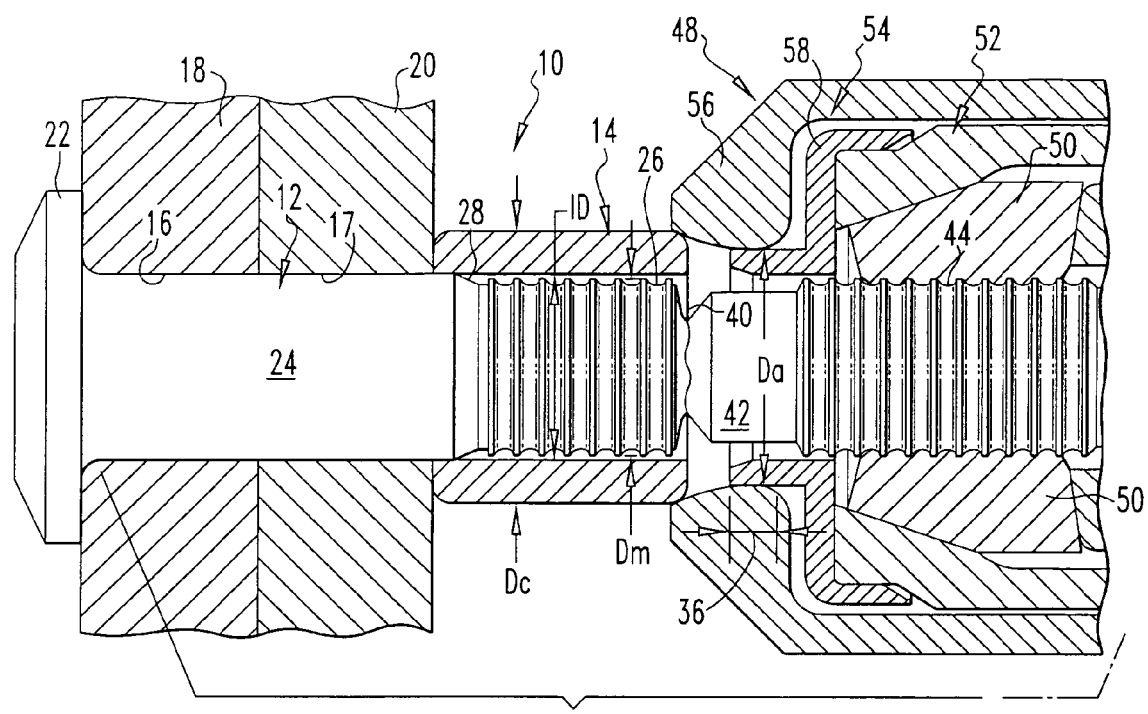
FIG. 1 is a longitudinal view with some portions shown in section and others shown broken away of a fastener of the present invention in assembly relationship with a portion of a tool shown as applied to the fastener prior to installation and for securing workpieces.
Figure 2:
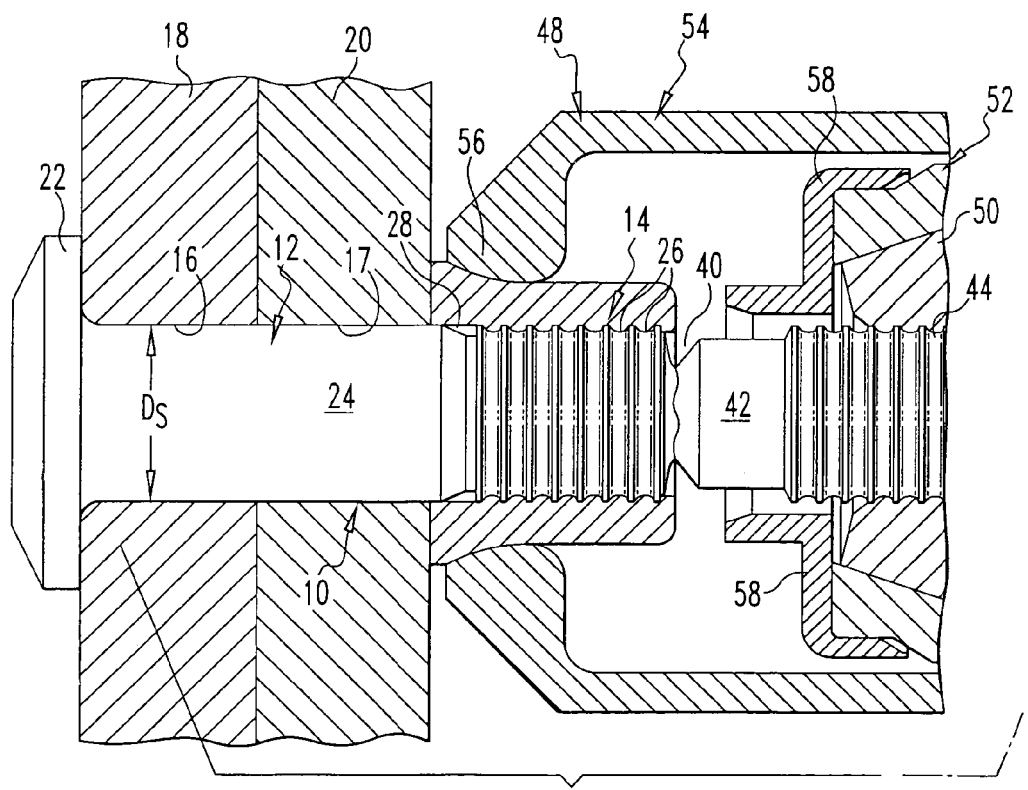
FIG. 2 is a view similar to that of FIG. 1 showing the fastener securing workpieces at a minimum grip of the tool and with the swage anvil of the tool shown in the engaged, installed condition.

Looking now to FIGS. 1 and 2, a fastener 10 is shown to include a pin member 12 and tubular collar 14. Pin member 12 has an elongated shank 15 which extends through aligned openings 16 and 17 in a pair of workpieces 18 and 20, respectively, to be secured together. An enlarged protruding head 22 at one end of shank 15 engages one side of workpiece 18. Adjacent the head 22, the shank 15 has a straight portion 24 which is adapted to be received within aligned bores 16 and 17 with a slight clearance fit or interference fit. Following the straight portion 24 is a plurality of circumferentially extending, annular lock grooves 26. A transition portion 28 smoothly connects the lock grooves 26 with straight shank portion 24.

A breakneck groove 40 is located adjacent the lock grooves 26 and defines the weakest portion on the shank 15. A straight land 42 is located between the breakneck groove 40 and a plurality of pull grooves 44. The land 42 is of a reduced diameter relative to the shank portion 24, the lock grooves 26 and the pull grooves 44. The pull grooves 44 are adapted to be gripped by a tool 48 which is actuable to set the fastener 10. The tool 48 can be generally constructed in a manner known to those skilled in the art and therefore is only partially shown for purposes of simplicity. Briefly, the tool 48 has a plurality of jaws 50 adapted to grip the pin 12 at pull grooves 44. Jaws 50 are located in a tubular collet assembly 52 which is slidably supported in an anvil housing 54 which terminates at one end in a swage anvil portion 56.

Figure 3:
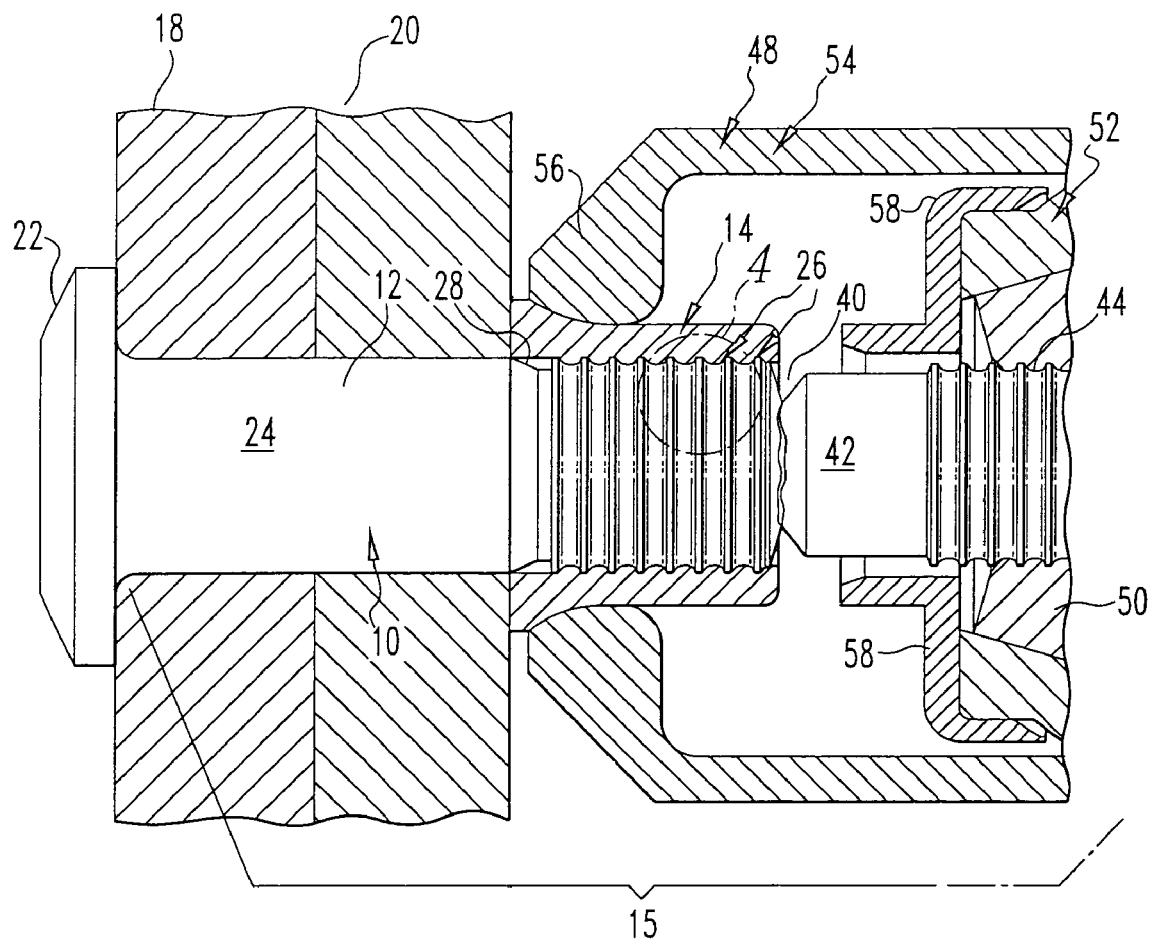
FIG. 3 is a view similar to that of FIG. 2 showing the fastener securing workpieces at a maximum grip of the tool and with the swage anvil of the tool shown in the engaged, installed condition.

The symmetrically shaped, tubular collar 14 is adapted to be located over the pin shank 15 and, with the workpieces 18, 20 pulled together, will be in radial alignment with some of the lock grooves 26. With actuation of the tool 48, a relative axial force is exerted between the pin 12 and collar 14 resulting in swage anvil portion 56 swaging the collar 14 into the lock grooves 26 of pin 12. Upon completion of the swaging, the shank 15 will be severed at the breakneck groove 40, as shown in FIG. 2. Subsequently, upon further actuation of the tool 48, a collar ejector member 58 will be urged forwardly to eject the swaged collar 14 from the anvil portion 56 thus completing the installation. FIG. 3 depicts the fastener 10 in an engaged, installed position with workpieces 18 and 20 of a maximum grip with workpieces 18 and 20 being of a maximum total thickness of the fastener 10. The workpieces 18 and 20 can vary in thickness by ⅛ inch and can still be fastened together with the fastener 10 of the present invention because the fastener 10 has a double grip range. Such an approach increases the versatility of the fastener 10 in securing workpieces 18 and 20 of varying thickness.

Figure 4:
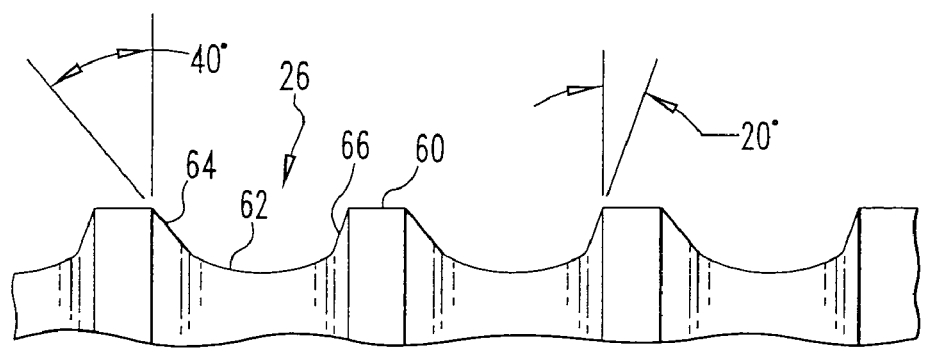
FIG. 4 is an enlarged fragmentary view taken in the circled area 4 in FIG. 3 of the lock grooves of the pin.
Figure 5:
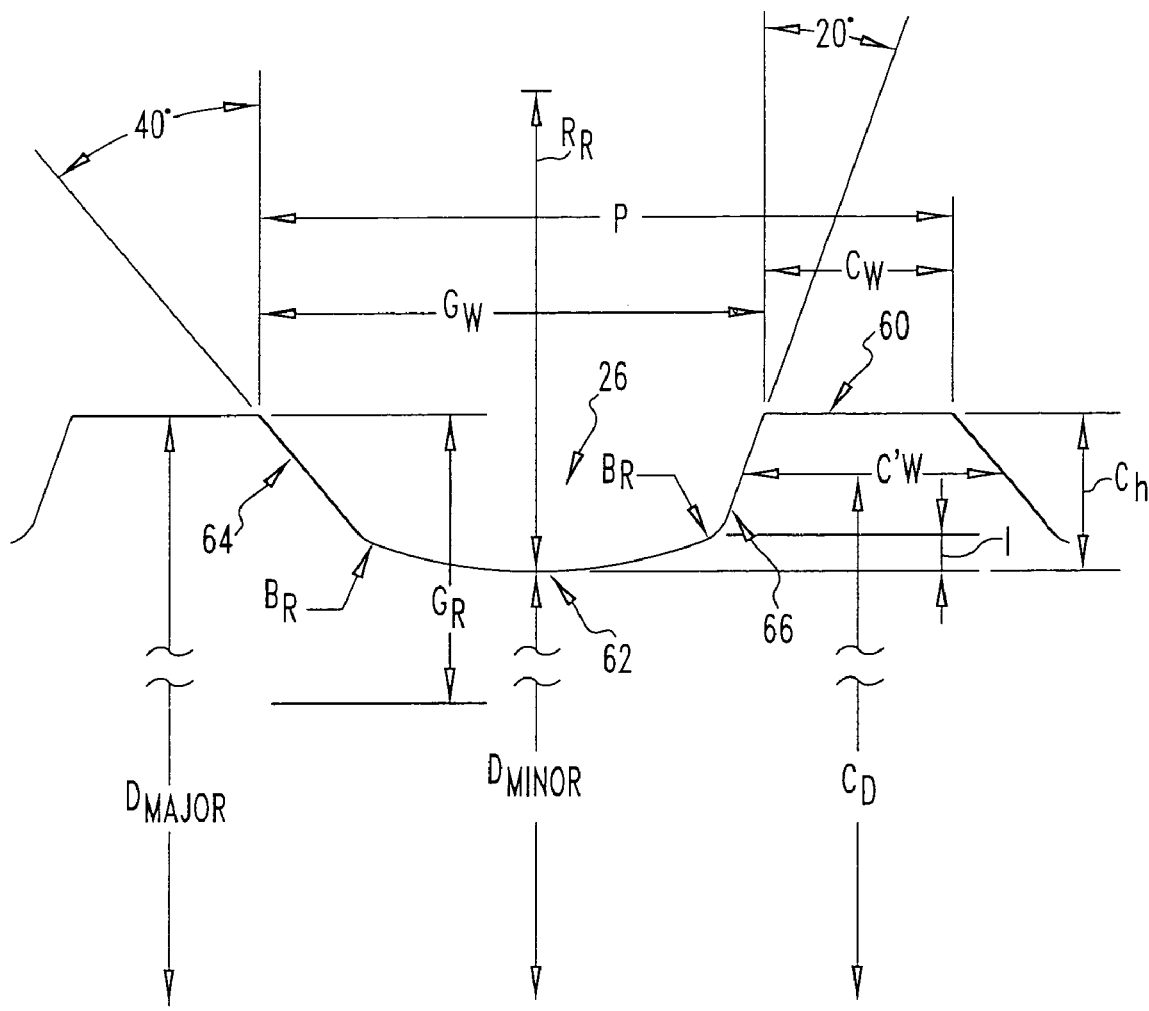
FIG. 5 is a fragmentary enlarged view of one of the lock grooves of FIG. 4.

As can best be seen in FIGS. 4 and 5, the lock grooves 26 and annular crests 60 are of a unique design that are optimized for a pin member of a preselected diameter for use in a plurality of applications with collars 14 of different materials and strength. The optimization technique employed by the present invention departs from the prior art practice of optimizing a fastener for a particular collar for a particular application. In the present invention, the lock groove 26 and crest 60 geometry is optimized for use in a plurality of applications wherein the lock grooves and crests are each provided with the longest width required for a specific application to provide the fastening system with satisfactory clamp and tensile loads and resistance to failure in the plurality of applications when the lock grooves are filled with various materials from different collars of various strengths. The optimized design can be used for all applications that involve the use of that pin diameter and enables the lock grooves 26 and crests 60 for that pin diameter to be manufactured with tooling that uses a common lock groove and crest geometry. Such an approach reduces the costs associated with the tooling.

The lock grooves 26 are capable of receiving materials of different strength from collars 14 during swage. The lock grooves 26, which are separated by crests 60 can be considered to be defined by a root portion 62, which is connected at one end to a leading transition portion 64 and at the opposite end to a trailing transition portion 66. In order to design a swage type fastener with lock grooves 26 and crests 60 of a uniform construction for use in a plurality of applications, the length of the lock grooves 26 and the length of the crests 60 are each optimized with reference to the clamp and load requirements for applications for each pin diameter for collars 14 of different materials. For example, Table 1 was used to optimize the length of the lock grooves 26 and crests 60 for each of a plurality of different pin diameters for use with collars of different materials for a plurality of applications.

TABLE 1

Minimum Mechanical Performance of Pin Member of Various Diameters in Relation to Various Collars for Different Applications Mechanical Performances (lbs.)

| Pin Diameter | Collar Material | Type of application: | | |
|---|---|---|---|---|
| | | Shear | Shear/Tension | Tension |
| | | Material to join: | | |
| | | Metal | Metal | Metal |
| | | Lock Grooves: | | |
| | | 5 | 5 | 6 |
| | | Aluminum | Titanium 3-2.5 Stainless 303 | Titanium 3-2.5 Stainless 303 |
| 5/32" | Tensile | 1,400 | 1,700 | 2,300 |
| | Clamp | 700 | 850 | 1,150 |
| 3/16" | Tensile | 1,600 | 2,400 | 2,750 |
| | Clamp | 800 | 1,200 | 1,375 |
| 7/32" | Tensile | 2,250 | 3,450 | 3,880 |
| | Clamp | 1,125 | 1,725 | 1,940 |
| 1/4" | Tensile | 3,000 | 4,500 | 5,000 |
| | Clamp | 1,500 | 2,250 | 2,500 |
| 5/16" | Tensile | 5,000 | 6,850 | 8,300 |
| | Clamp | 2,500 | 3,425 | 4,150 |
| 3/8" | Tensile | 7,000 | 10,200 | 12,700 |
| | Clamp | 3,500 | 5,100 | 6,350 |
| 7/16" | Tensile | 9,500 | 13,100 | 19,000 |
| | Clamp | 4,750 | 6,550 | 9,500 |
| 1/2" | Tensile | 12,500 | 18,000 | 25,500 |
| | Clamp | 6,250 | 9,000 | 12,750 |

With reference to the specific clamp and tensile loads required by Table 1 for particular applications, the lock grooves 26 were optimized for a specific application for each pin diameter as follows.

Equation 1 defines the available shear area for the lock grooves 26:

$$\Pi\, D_{MAJOR} N\, G_W = \text{Shear Area} \quad \text{(Equ. 1)}$$

wherein:

$D_{MAJOR}$ is the major diameter of the crests 60;
N is the minimum number of lock grooves 26 on the pin member 12 engaged by the swaged material of the collar 14 over the grip range of the fastener 10; and
$G_W$ is the groove width of the lock grooves 26.

Equation 2 defines the amount of tensile load that the lock grooves 26 would be able to control:

$$T \times \text{Shear Area} = \text{Tensile Load} \quad \text{(Equ. 2)}$$

wherein:
T is the shear strength of the collar 14 material; and
Shear Area is the value from Equation 1.

In the case of the present invention, the $G_W$ of the lock grooves 26 is optimized to provide the longest groove width for a specific application that can be used in all applications for the load requirements of a specific pin diameter. The longest groove width required for a specific application for a specific pin diameter is then used as the standard groove width for that specific pin diameter. In certain embodiments, the $G_W$ of the lock grooves 26 is optimized for aluminum 2024T4 alloy in shear applications. In alternate embodiments, the $G_W$ of the lock grooves 26 is optimized for titanium 3A1-2.5V alloy in tension applications. Generally, aluminum 2024T4 alloy is of lesser strength than stainless 303 SE alloy steel and titanium 3A1-2.5 V alloy and stainless 303 SE alloy is considered to be about equal in strength to titanium 3A1-2.5 V alloy. See Table 2 set forth herein for a comparison of material properties. Typically, the $G_W$ of the lock grooves 26 of the present invention are optimized to provide the fastening system with a strength equal to or greater than one hundred ten percent (110%) of a customer's tensile load requirements for a particular application.

After standardizing the groove width for a specific application for a specific pin diameter, the crests 60 were optimized for each pin diameter as follows.

Equation 3 defines the available shear area for the crests 60:

$$\Pi\ C_D\ N\ C'_W = \text{Shear Area} \qquad (\text{Equ. 3})$$

wherein:

$C_D$ is the effective crest diameter of the crests 60 wherein $C_D$ is equal to about $D_{MAJOR} - C_h$;

N is the minimum number of lock grooves 26 on the pin member 12 engaged by the swaged material of the collar 14 over the grip range of the fastener 10; and $C'_W$ is the effective crest width at about half the height of $C_h$.

Equation 4 defines the amount of tensile load that the crests 60 would be able to control:

$$T \times \text{Shear Area} = \text{Tensile Load} \qquad (\text{Equ. 4})$$

wherein:

T is the shear strength of the pin member 12; and

Shear Area is the value from equation 3.

The $C'_W$ of the crests 60 are optimized for each pin diameter to be able to resist failure when the lock grooves 26 are filled with a collar 14 of a relatively higher strength material such as titanium 3A1-2.5V alloy in tension applications. Typically, for the majority of the various pin diameters of the pin member 12, the $G_W$ of the lock grooves 26 is optimized for aluminum 2024 alloy in shear applications and the $C'_W$ of the crests 60 is optimized for titanium 3A1-2.5V alloy in tension applications. While it could be stated that such an approach only partially optimizes the lock groove 26 and crest 60 design of the fastener 10 because the lock grooves 26 and crests 60 are optimized for different applications, the lock grooves 26 and crests 60 are nonetheless optimized for use across a plurality of applications because the fastener 10 provides satisfactory clamp and tensile loads and resistance to failure in the plurality of applications when the lock grooves 26 are filled with different collar 14 materials. In other cases, where the $G_W$ of the lock grooves 26 and the $C'_W$ of the crests 60 are both optimized for titanium 3A1-2.5V alloy in tension applications, the $G_W$ of the lock grooves 26 is not greater than ten percent (10%) of the width of the lock grooves 26 if the lock grooves 26 had been optimized for aluminum 2024T4 alloy. While it could be stated that such an approach fully optimizes the lock groove 26 and crest 60 design of the fastener 10 for the tension application because the lock grooves 26 and crests 60 are both optimized for the same application, the lock grooves 26 and crests 60 are nonetheless optimized for use across a plurality of applications because the fastener 10 provides satisfactory clamp and tensile loads and resistance to failure in the plurality of applications when the lock grooves 26 are filled with different collar 14 materials.

Typically, the $C'_W$ of the crests 60 of the present invention are optimized to provide the fastening system with a strength equal to or greater than one hundred twenty percent (120%) of a customer's tensile load requirements for a particular application for a particular pin diameter. In the preferred embodiment of the invention, the pin member 12 is manufactured from titanium 6A1-4V alloy, the $G_W$ of the lock grooves 26 has the longest groove width that is required for a specific application to provide satisfactory clamp and tensile loads in all applications for a specific pin diameter, the $C'_W$ of the crests 60 is optimized to avoid failure when the lock grooves 26 are filled with titanium 3A1-2.5V alloy and the pin diameter falls within the range of from around 5/32 inch to around 1/2 inch.

After the lock grooves 26 and crests 60 are each optimized for a specific application in each of the plurality of different pin diameters, an appropriate collar 14 of a preselected material and a calculated outside diameter is selected for swaging into the lock grooves 26 to provide the fastening system with satisfactory clamp and tensile loads for a selected application. Typically, a collar 14 made of aluminum 2024 alloy would be used in shear applications and a collar 14 made of stainless 303SE alloy steel or titanium 3A1-2.5V alloy would be used in shear/tension or tension applications. To obtain the desired clamp and tensile load for each of the applications, the calculated outside diameter of the collar 14 is modified through experimentation while keeping the lock groove 26 and crest 60 geometry and the diameter of the throat (Da of FIG. 1) of the swage anvil 56 portion constant. Through experimentation, the outside diameter of the modified collars 14 of different materials only have slight variations in the outside diameter that enables the modified collar 14 to be swaged into the lock grooves 26 with a swage anvil 56 that has a uniform swage anvil cavity for shear, shear/tension, shear composite and shear/tension composite applications. It has been found that a collar 14 of about the same outside diameter does not work well in tension and tension composite applications. Therefore, a collar 14 of greater outside diameter and a different swage anvil 56 is used for tension and tension composite applications.

Such a uniform swage anvil portion 56 provides the customer with the additional benefit of being able to install collars 14 with a common installation tool 48 for many applications for a specific pin diameter. This feature provides the customer of the fastener 10 with the benefit of only needing to keep an inventory of a single tool with a uniform swage anvil portion 56 for a specific pin diameter for use in shear, shear/tension, shear composite and shear/tension composite applications. Such an approach would minimize the time required for an operator to exchange swage anvils in tools for use in other applications for a specific pin diameter. As can be appreciated, the savings on labor to an end user due to such an approach would be substantial.

The load requirements provided in Table 1 to design the fastening system of the present invention would also be useful across the board for the range of load requirements for shear, shear/tension and tension applications for use in the field of commercial and military aircraft because both types of aircraft have a similar range of load requirements for shear, shear/tension and tension applications. Therefore, the fastening system of the present invention would additionally be valuable for use in commercial and military aircraft applications.

As can readily be seen from Table 1, different collar materials may be utilized with the optimized lock groove 26 and crest 60 design for each pin diameter in shear, shear/tension or tension applications to obtain a variety of tensile and clamp loads. It should be noted that the different applications may require more or less lock grooves 26 than other applications. In any regard, for a specific pin diameter, the lock groove 26 and crest 60 geometry remains constant. Also, for pull type swage fasteners, different applications would require breakneck grooves 40 adapted to fracture at different magnitudes of axial tensile force based on the swage load requirements for a particular application. Conversely, stump type fasteners would not have the limitation of the breakneck groove because such a fastener does not have a breakneck groove. Also, there may some applications where a removable mandrel could be utilized in place of a severable pintail or a tool with a threaded external drive and/or threaded mandrel for an internal drive such as shown in U.S. Pat. No. 5,604,968. In the preferred embodiment of the invention, the optimized lock grooves 26 for each pin diameter is able to receive a collar 14 of various materials such as titanium, steel and aluminum alloys for various applications. As can be appreciated, the collars 14 of different materials provide a variety of preselected clamp and tensile loads for the optimized lock grooves 26 and crests 60 of a specific pin diameter.

Table 1 relates to fastening workpieces 18 and 20 of metal, i.e. such as aluminum. It should be understood that a similar table of values could be provided for applications where the workpieces 18 and 20 would be made of a composite material. While collar 14 is shown as a tubular collar 14 in FIGS. 1–3 for securing workpieces 18 and 20 of metal, a flanged type collar would be used to secure workpieces made of composite materials. Also, while particular attention is given to collars made of aluminum 2024T4 alloy, titanium 3A1-2.5V alloy and stainless 303 SE alloy steel in Table 1, one of skill in the art would appreciate that other aluminum alloys, other titanium alloys, other steel alloys or other metallic alloys or materials could be used for the collars 14 with a pin 12 having lock grooves 26 and crests 60 of a uniform geometry and would provide different tensile and clamp loads for shear, shear/tension, tension or other applications.

The following Examples demonstrate the magnitude of shear and tensile strengths between shear, shear/tension and tension applications.

EXAMPLE 1

Magnitude of Minimum Shear Strength in ksi and Minimum Tensile Requirement in Pounds for 5/32 Inch Pin Diameter

| Type of Application | Lock Grooves Actual | Lock Grooves Used | Collar Material | Min. Shear | Min. Tensile |
|---|---|---|---|---|---|
| Shear | 5 | 5 | Aluminum 2024 | 37 | 1,400 |
| Shear/Tension | 5 | 5 | Titanium 3Al-2.5 V | 58 | 1,700 |
| Tension | 6 | 6 | Titanium 3Al-2.5 V | 58 | 2,300 |

As can be seen from Example 1, the ratio of shear strengths between shear and tension applications is about 64% and the ratio of tensile strengths between shear and tension applications is about 61%.

EXAMPLE 2

Magnitude of Minimum Shear Strength in ksi and Minimum Tensile Requirement in Pounds for 7/16 Inch Pin Diameter

| Type of Application | Lock Grooves Actual | Lock Grooves Used | Collar Material | Min. Shear | Min. Tensile |
|---|---|---|---|---|---|
| Shear | 5 | 5 | Aluminum 2024 | 37 | 9,500 |
| Shear/Tension | 5 | 5 | Titanium 3Al-2.5 V | 58 | 13,100 |
| Tension | 6 | 6 | Titanium 3Al-2.5 V | 58 | 19,000 |

As can be seen from Example 2, the ratio of shear strengths between shear and tension applications is about 64% and the ratio of tensile strengths between shear and tension applications is about 50%.

Furthermore, as can be seen from FIG. 5, the fastener of the present invention is further defined by the following relationships:

P is equal to $G_W + C_W$ $R_R$ is equal to $G_W$ $C_h$ is equal to 4I $B_R$ is equal to 0.005 inch for pin diameters of 5/32 to 1/2 inch The fastener of the present invention is further defined by the relationships:

For pin member diameters of 3/8, 7/16 and 1/2 inch, $C_h$ is equal to $D_S \times 0.03125$ For pin member diameters of 5/32, 3/16, 7/32, 1/4 and 5/16 inch, $C_h$ is equal to $(D_S \times 0.03125) + 0.002$ In the above relationships:

P=pitch;

$G_W$=the lock groove 26 width;

$C_W$=the crest 60 width;

$R_R$=root radius;

$C_h$=the crest 60 height;

I=the distance between a horizontal tangent to the root radius and a horizontal tangent to the intersection of the root portion 62 and the trailing portion 66;

$D_S$=the diameter of the straight portion 24; and $B_R$=blend radius.

In one form of the invention, the leading transition portion 64 was provided to be at a 40 degree angle with a plane transverse to the axis of pin 12 while the trailing transition portion 66 was provided to be at a steeper angle of 20 degrees. The angle of the leading portion 64 facilitates flow of the material of collar 14 in swage while the steeper angled trailing portion 66 provides a buttressing effect to contain the swaged collar material. This buttressing effect facilitates clamping of the workpieces 18 and 20 as the collar 14 elongates during swage. The transition portions 64 and 66 intersect the roundlike root portion 62 whereby a smooth transition is provided.

With this lock groove 26 construction, it is desirable to provide the collar 14 with a volume such that when swaged into the lock grooves 26 it will have an excess volume over that required to fill the lock grooves 26. In one embodiment, the volume of collar 14 was selected to provide 'overpacking', i.e., a volume of collar 14 to provide substantially more volume of collar material for filling lock grooves 26 than it could normally accept within the swage envelope defined by the throat 36 of the swage cavity of anvil 56 and the confronting portion of pin 12 (see FIG. 1). In the present system, it has been found desirable to provide a volume of collar material which has an excess of at least around 17% to around 25% for the various collar 14 materials that are used. The percentage 'overfill' or 'overpacking' noted can be generally determined for a finite length of the effective swage portion of throat 36 (see FIG. 1) by the relationship:

$$100 \times \frac{[(Dc^2 - ID^2) - (Da^2 - Dm^2)]dl}{[Da^2 - Dm^2]dl} = \% \text{ overfill}$$

wherein:
Da is the diameter of the throat 36 of anvil 56;
Dc is the outside diameter of the collar 14 before swage;
ID is the inside diameter of the collar 14 before swage;
Dm is the mean diameter of the lock grooves 26; and
dl is considered to be a finite length within the swage portion of throat 36.

It is also desirable that the pin member 12 be hard enough relative to the hardness of the collar 14 to resist crushing or substantial yielding in tension from the high compressive swage loads of different collar materials. In a preferred embodiment, it was found that the following material properties of the pin member 12 and collars 14 set forth in Table 2 satisfied the requirements of the fastening system of the invention:

TABLE 2

Material Properties for Pin Member and Collars

| Material | Usage | Minimum Tensile Strength (ksi) | Minimum Shear Strength (ksi) | Young's Modulus (msi) | Density (pci) |
|---|---|---|---|---|---|
| Titanium 6Al-4 V alloy | Pin Member | 165.0 | 95.0 | 16.0 | 0.160 |
| Titanium 3Al-2.5 V alloy | Collar | 99.0 | 60.0 | 15.0 | 0.162 |
| Stainless 303 SE alloy | Collar | 89.9 | 61.6 | 28.8 | 0.289 |
| Aluminum 2024T4 alloy | Collar | 62.0 | 37.0 | 10.5 | 0.101 |

Generally, in the present invention, it is desirable to utilize a pin member 12 and collar 14 to provide a fastening system that has desirable clamp strengths and pin yields to provide the pin member 12 with a sufficient hardness to accept both the high tensile preloads desired and the swage loads on the collar 14 substantially without yielding. In order to realize high clamp loads, the collar 14 must have a sufficient wall thickness and, therefore, volume to insure that enough collar material will move axially in elongation. At the same time it is desirable that the swaged collar have sufficient wall thickness and, therefore, have sufficient strength to resist any significant spring back from the lock grooves 26. The collar wall also should have sufficient thickness to resist significant radial expansion under tensile load such that the crests 60 and collar shoulders remain in substantially full engagement as the design tensile load on the joint is reached. If the wall does not provide sufficient radial stiffness, the collar 14 could expand radially under tensile load, reducing the effective shear plane carrying the load. The result could be a premature failure in shear at the tips of the crests 60 or collar 14 shoulders. In this regard, the required wall thickness of the collar 14 will increase as a function of its diameter Dc. Thus, the final swaged wall thickness must be sufficient to withstand at least the minimum design tensile load such that failure will occur in shear generally across the maximum effective shear plane of the collar 14. If the collar wall is too thick, it will impede swaging and require excessive installation loads.

Thus, the collar wall thickness is selected to provide the necessary material to promote swaging into the lock grooves 26 and flow in elongation of the pin member 12 to provide the desired clamp load. At the same time, the collar wall thickness at final swage is also selected to provide sufficient, radial stiffness or hoop strength to resist significant radial spring back from the lock grooves 26 both during initial swage and also under subsequent tensile loading. Also, the volume of the collar 14 and swage cavity 36 are selected to provide movement of the material of collar 14 into the lock grooves 26 to assure a good fill. In this invention, it was found that between around 17%–25% overfill of the lock grooves 26 provided satisfactory results. In this regard, an overfill significantly under 17% would not provide the desired high preloads while an overfill significantly over 25% could result in excessive installation loads which could yield the pin member 12.

Figure 6:
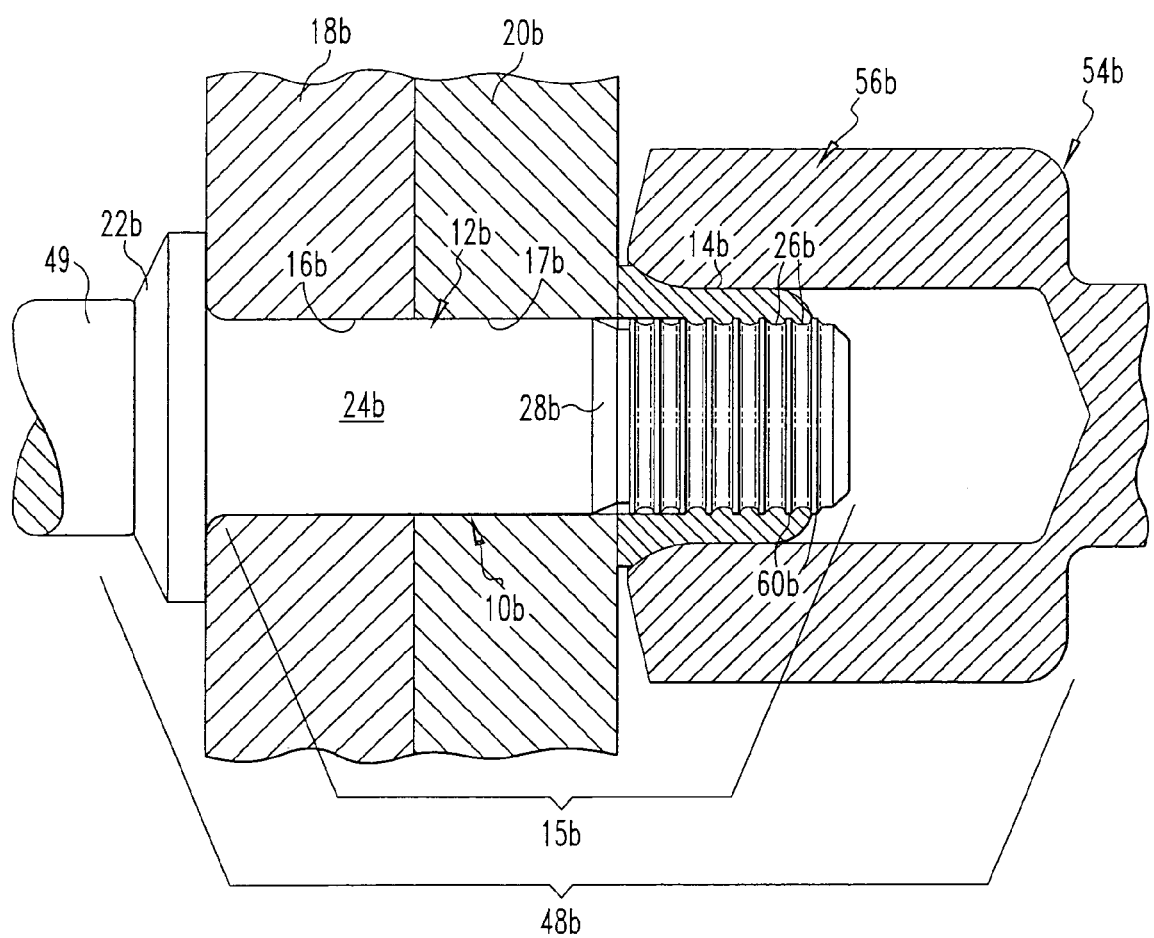
FIG. 6 is a sectional view of a fastener similar to that of FIGS. 1–3 and with the fastener being of a stump type instead of a pull type and for securing workpieces of a maximum thickness for the fastener.

The embodiments of FIGS. 1–3 show pull type fasteners; the features of the present invention, however, are also applicable to a stump type fastener as shown in FIG. 6. In the description of the embodiment of FIG. 6, components similar to like components in the embodiments of FIGS. 1–3 have been given the same number designation with the addition of the letter subscript "b". Except for the pull portion of FIGS. 1–3, the other elements of the fastener 10 provided in the embodiment of FIGS. 1–3 are provided in the embodiment of FIG. 6 and for the sake of being concise, FIG. 6 will only be briefly addressed herein because one of ordinary skill in the art would understand that fastener 10b of FIG. 6 is similar in design and operation to the fastener 10 of FIGS. 1–3.

Looking now to FIG. 6, a fastener 10b is shown to include a pin member 12b and tubular collar 14b. Pin member 12b has an elongated shank 15b which extends through aligned openings 16b and 17b in a pair of workpieces 18b and 20b, respectively, to be secured together. A head 22b at one end of shank 15b engages one side of workpiece 18b. Adjacent the head 22b, the shank 15b has a straight portion 24b which is adapted to be received within bores 16b and 17b with a slight clearance fit or interference fit. Following the straight portion 24b is a plurality of circumferentially extending, annular lock grooves 26b. A transition portion 28b smoothly connects the lock grooves 26b with straight shank portion 24b.

The fastener 10b is adapted to be set by a tool assembly 48b of a squeeze type which can generally be constructed in a manner known to those skilled in the art and hence has been only partially shown for purposes of simplicity. Briefly, the tool 48b included an anvil housing 54b which terminates at one end in a swage anvil portion 56b and a bucking member 49.

The symmetrically shaped, tubular collar 14b is adapted to be located over the shank 15b and, with the workpieces 18b, 20b moved together, will be in radial alignment with some of the lock grooves 26b. With actuation of the tool 48b, the swage anvil portion 56b moves against the collar 14b with the bucking member 49 resisting the axial force applied thereby; the resultant pushing force causes the workpieces

18*b* and 20*b* to be pressed together. As this relative force increases the swage anvil portion 56*b* will move over the collar 14*b* resulting in swaging of the collar 14*b* into the lock grooves 26*b* of pin 12*b*. Subsequently, upon further actuation of the tool 48*b*, the anvil portion 56*b* will be removed from the swaged collar 14*b*.

Note that in the stump version of FIG. 6, the anvil portion 56*b* will provide the same desired overpacking of the collar 14*b* into the lock grooves 26*b* resulting in a desirable high, retained preload on the fastened joint of the yield point of the pin 12*b*. While collar 14*b* is shown as a tubular collar in FIG. 6 for securing workpieces 18*b* and 20*b* of metal, a flanged type collar would be used to secure workpieces made of composite materials.

Having described the presently preferred embodiments of the invention, it is to be understood that the invention may be otherwise embodied within various functional equivalents disclosed within the scope of the appended claims.

What is claimed is:

1. A fastening system for securing a plurality of workpieces together in a fastened joint in a pluarlity of application having different load requirements, the fastening system comprising:
   a first pin and a second pin;
   each of the pins having an elongated shank and terminating at one end in an enlarged head and at its opposite end in a grooved portion comprising a plurality of circumferentially extending lock grooves and crests, the lock groove and crest geometry of the pins engaging a first collar or a second collar to fasten together the workpieces in the plurality of applications having different load requirements wherein the lock grooves of the first pin are of the longest width required for the first collar of lower strength in a shear application and the lock grooves of the second pin are of the longest width required for the second collar of greater strength in a tension application, and the crests of the pins are of the longest width required for the second collar of greater strength in the tension application, wherein the first collar and the second collar are of different strengths and different materials and the lock groove width for the second pin differs from the lock groove width for the first pin by no more that 10%, wherein the applications are selected from the group consisting of shear, shear/tension, tension, shear composite, shear tension composite and tension composite applications; and
   wherein either the first collar or second collar can be attached to the first pin or the second pin.

2. The fastening system of claim 1 wherein the first collar has a shear strength of about 64% of the shear strength of the second collar.

3. The fastening system of claim 1 wherein the first collar is made of an aluminum ally and the second collar is made of titanium alloy.

4. The fastening system of claim 1 wherein the lock grooves are overpacked in the range of 17% to 25%.

5. The fastening system of claim 1 wherein the workpieces are made of metal composites or combinations thereof.

6. The fastening system of claim 1 wherein the collars have about the same outside diameter and are swaged into the lock grooves of the pin with an installation tool having a swage anvil with a uniform swage cavity.

7. The fastening system of claim 1 wherein the pin fastens workpieces that vary in thickness up to ⅛ of an inch.

8. A fastening system for securing a plurality of workpieces together in a fastened joint in a pluarlity of applications having different load requirements, the fastening system comprising:
   a first pin and a second pin;
   each of the pins having an elongated shank and terminating at one end in an enlarged head and at its opposite end in a grooved portion comprising a plurality of circumferentially extending lock grooves and crests, the lock groove and crest geometry of the pins engaging a first collar or a second collar to fasten together the workpieces in three or more of the applications having different load requirements wherein the lock grooves of the first pin are of longest width required for the first collar of lower strength in a shear application and the lock grooves of the second pin are of the longest width required for the second collar of greater strength in a tension application, and the crests of the pins are of the longest width required for the second collar of greater strength in the tension application, wherein the first collar and the second collar are of different strengths and different materials, wherein the three or more applications are selected from the group consisting of shear, shear/tension, tension, shear composite, shear/ tensions composite and tensions composite applications, and wherein the lock grooves are defined by a root radius extending from a lowermost portion of the lock grooves vertically and the lock groove width extends horizontally across the lock grooves with the root radius equal to the lock groove width; and
   wherein either the first collar or second collar can be attached to the first pin or the second pin.

9. The fastening system of claim 8 wherein the first collar has a shear strength of about 64% of the shear strength of the second collar.

10. The fastening system of claim 8 wherein the first collar is made of an aluminum ally and the second collar is made of titanium alloy.

11. The fastening system of claim 8 wherein the lock grooves are overpacked in the range of 17% to 25%.

12. The fastening system of claim 8 wherein the workpieces are made of metal composites or combinations thereof.

13. The fastening system of claim 8 wherein the collars have about the same outside diameter and are swaged into the lock grooves of the pin with an installation tool having a swage anvil with a uniform swage cavity.

14. The fastening system of claim 8 wherein the pin fastens workpieces that vary in thickness up to ⅛ of an inch.

15. A fastening system for securing a plurality of workpieces together in a fastened joint in a pluarlity of applications having different load requirements, the fastening system comprising:
   a first pin and a second pin;
   each of the pins having an elongated shank and terminating at one end in an enlarged head and at its opposite end in a grooved portion comprising a plurality of circumferentially extending lock grooves and crests, the lock groove and crest geometry of the pins engaging a first collar or a second collar to fasten together the workpieces in the plurality of applications having different load requirements wherein the lock grooves of the first pin are of the longest width required for the first collar of lower strength in a shear application, and the crests of the pins are of the longest width required for the second collar of greater strength in a tension application, wherein the first collar and the second collar are of different strengths and different materials, wherein the applications are selected from the group consisting of shear, shear/tension, tension, shear composite, shear tension composite and tension composite applications; and wherein either the first collar or second collar can be attached to the first pin or the second pin.

16. The fastening system of claim 15 wherein the first collar has a shear strength of about 64% of the shear strength of the second collar.

17. The fastening system of claim 15 wherein the first collar is made of an aluminum ally and the second collar is made of titanium alloy.

18. The fastening system of claim 15 wherein the lock grooves are overpacked in the range of 17% to 25%.

19. The fastening system of claim 15 wherein the workpieces are made of metal composites or combinations thereof.

20. The fastening system of claim 15 wherein the collars have about the same outside diameter and are swaged into the lock grooves of the pin with an installation tool having a swage anvil with a uniform swage cavity.

21. The fastening system of claim 15 wherein the pin fastens workpieces that vary in thickness up to ⅛ of an inch.

* * * * *